(12) United States Patent
Kiwaki

(10) Patent No.: US 9,868,325 B2
(45) Date of Patent: Jan. 16, 2018

(54) PNEUMATIC TIRE

(71) Applicant: BRIDGESTONE CORPORATION, Tokyo (JP)

(72) Inventor: Yukihiro Kiwaki, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 315 days.

(21) Appl. No.: 14/432,854

(22) PCT Filed: Sep. 25, 2013

(86) PCT No.: PCT/JP2013/005681
§ 371 (c)(1),
(2) Date: Apr. 1, 2015

(87) PCT Pub. No.: WO2014/064885
PCT Pub. Date: May 1, 2014

(65) Prior Publication Data
US 2015/0273952 A1 Oct. 1, 2015

(30) Foreign Application Priority Data
Oct. 24, 2012 (JP) ................................. 2012-235052

(51) Int. Cl.
*B60C 11/00* (2006.01)
*B60C 11/13* (2006.01)
(Continued)

(52) U.S. Cl.
CPC ...... *B60C 11/1307* (2013.01); *B60C 11/0309* (2013.01); *B60C 11/1236* (2013.01);
(Continued)

(58) Field of Classification Search
CPC .................. B60C 11/1307; B60C 11/0309
See application file for complete search history.

(56) References Cited

U.S. PATENT DOCUMENTS 6,196,288 B1   3/2001  Radulescu et al.
D662,035 S  * 6/2012  Delbast ........................ D12/584
(Continued)

FOREIGN PATENT DOCUMENTS

CN        101168342 A    4/2008
JP        H06-286422 A   10/1994
(Continued)

OTHER PUBLICATIONS

Jan. 7, 2014 International Search Report issued in PCT/JP2013/005681.
(Continued)

*Primary Examiner* — Timothy Kennedy
(74) *Attorney, Agent, or Firm* — Oliff PLC

(57) ABSTRACT

A pneumatic tire, while achieving excellent drainage performance by projections and depressions formed in a circumferential groove, can reduce road noise by making the circumferential stiffness of a land portion uniform even in the presence of such projections and depressions. A plurality of protuberances are arranged in at least one circumferential groove at intervals in the tread circumferential direction, the protuberances being raised from the inner surface of the circumferential groove and extending from the groove bottom of the circumferential groove to at least one groove wall surface in the tread width direction. A plurality of sipes are arranged in a land portion adjacent to the groove wall surface of the circumferential groove to which the protuberances extend, the sipes being open to the circumferential groove in areas where the respective protuberances are arranged.

11 Claims, 2 Drawing Sheets

(51) Int. Cl.
*B60C 11/03* (2006.01)
*B60C 11/12* (2006.01)

(52) U.S. Cl.
CPC ............. *B60C 2011/0341* (2013.01); *B60C 2011/0344* (2013.01); *B60C 2011/0381* (2013.01); *B60C 2011/1338* (2013.01)

(56) References Cited

U.S. PATENT DOCUMENTS

| | | | |
|---|---|---|---|
| 2008/0093000 A1 | 4/2008 | Fujioka | |
| 2011/0146863 A1* | 6/2011 | Ochi | B60C 11/0306 152/209.18 |
| 2011/0290391 A1* | 12/2011 | Kiwaki | B60C 11/0302 152/209.18 |
| 2012/0318419 A1* | 12/2012 | Iwabuchi | B60C 11/0304 152/209.8 |

FOREIGN PATENT DOCUMENTS

| | | |
|---|---|---|
| JP | H07-025207 A | 1/1995 |
| JP | H09-109614 A | 4/1997 |
| JP | H09-300914 A | 11/1997 |
| JP | H10-024705 A | 1/1998 |
| JP | 2000-006617 A | 1/2000 |
| JP | 2001-026205 A | 1/2001 |
| JP | 2001-322407 A | 11/2001 |
| JP | 2003-154812 A | 5/2003 |
| JP | 2005-112030 A | 4/2005 |
| JP | 2008-105481 A | 5/2008 |
| JP | 2011-235741 A | 11/2011 |
| WO | 00/51831 A1 | 9/2000 |

OTHER PUBLICATIONS

Aug. 19, 2015 Office Action issued in Chinese Patent Application No. 201310508537.4.

* cited by examiner

PNEUMATIC TIRE

TECHNICAL FIELD

The present invention relates to a pneumatic tire.

BACKGROUND

For pneumatic tires which ma run on wet road surfaces, required drainage performance is typically ensured by providing one or more circumferential grooves continuous in the tread circumferential direction and draining water in the ground contact surface through the circumferential grooves.

Patent Literature (PTL) 1 describes a tire that further improves the drainage performance by the above-mentioned circumferential grooves.

CITATION LIST

Patent Literature

PTL: JP 2011-235741 A

In the tire described in PTL 1, intra-groove sub-grooves arranged at intervals in the tread circumferential direction each extend from the groove bottom of a circumferential groove to one groove wall surface. As a result, a land portion shaped like a rib or the like and adjacent to the groove wall surface to which the intra-groove sub-grooves extend partially decreases in stiffness in the areas where the intra-groove sub-grooves are formed. The stiffness of the land portion is therefore not uniform in the tread circumferential direction, and elastic vibrations of such a land portion with non-uniform stiffness may cause road noise.

To solve the problem of the conventional technique stated above, the present invention has an object of providing a pneumatic tire that, while achieving excellent drainage performance by projections and depressions formed in a circumferential groove, can reduce road noise by making the circumferential stiffness of a land portion uniform even in the presence of such projections and depressions.

SUMMARY

A pneumatic tire according to the present invention is a pneumatic tire in which at least one circumferential groove continuously extending in a tread circumferential direction is formed in a tread surface to define land portions by the circumferential groove, wherein a plurality of protuberances are arranged in the circumferential groove at intervals in the tread circumferential direction to define an intra-groove groove between protuberances adjacent in the tread circumferential direction, the plurality of protuberances being raised from an inner surface of the circumferential groove and extending from a groove bottom of the circumferential groove to at least one groove wall surface in a tread width direction, and a plurality of sipes are arranged in a land portion adjacent to the groove wall surface of the circumferential groove to which the plurality of protuberances extend, the plurality of sipes being open to the circumferential groove in areas where the respective plurality of protuberances are arranged.

The "tread surface" is the outer circumferential surface of the whole tire, which comes into contact with the road surface when the tire attached to an applicable rim and filled to a specified internal pressure tolls in a state of being placed under a load corresponding to a maximum load capacity. The "sipes" are fine grooves having such a groove width that allows facing groove wall surfaces to at least partially come into contact with each other in at least one part of a tire ground contact surface, e.g. the circumferential center of the tire ground contact surface where the largest ground contact pressure acts.

The "tire ground contact surface" is the part of the tire in contact with the road surface, i.e. the part of the tread surface in the circumferential direction, when the tire attached to the applicable rim and filled to the specified internal pressure is statically set upright on the road surface and placed under the toad corresponding to the maximum load capacity.

The "applicable rim" is the standard rim, design rim, or measuring rim defined in any of the below-mentioned standards according to the tire size. The "specified internal pressure" is the air pressure corresponding to the maximum load capacity as defined in the standard. The "maximum load capacity" is the maximum mass permitted to be loaded onto the tire in the standard. The standard is determined according to an effective industrial standard in areas where tires are produced or used. Examples of the standard include Year Book of the Tire and Rim Association, Inc. in the United States, Standards Manual of the European Tyre and Rim Technical Organisation in Europe, and JATMA Year Book of the Japan Automobile Tyre Manufacturers Association in Japan.

In the pneumatic tire according to the present invention, preferably, both side surfaces of each of the plurality of protuberances extending in the tread width direction are each shaped like a circular arc in the circumferential direction, and an outer surface of each of the plurality of protuberances in a tire radial direction is shaped like a circular arc concave to the groove wall surface to which the protuberance extends, in a sectional view along a direction orthogonal to the direction in which the circumferential groove provided with the protuberance extends.

In the pneumatic tire according to the present invention, preferably, the plurality of protuberances are arranged with a pitch equal to a pitch with which the plurality of sipes are arranged in the tread circumferential direction, and as tread circumferential distance between protuberances adjacent in the tread circumferential direction is less than or equal to half a tread circumferential length of each of the plurality of protuberances, at a tread widthwise center position of the protuberance extending in the tread width direction.

In the pneumatic tire according to the present invention, preferably, each of the plurality of sipes has one end open to the circumferential groove, and the other end terminating in the land portion in which the sipe is provided.

The expression "terminating in the land portion" means that the other end of the sipe is not open to as circumferential groove, and the other end of the sipe may be open to a groove provided in the land portion other than the circumferential groove.

Thus, in the pneumatic tire according to the present invention, a plurality of protuberances are arranged in the circumferential groove at intervals in the tread circumferential direction, the plurality of protuberances extending from the groove bottom of the circumferential groove to at least one groove wall surface in the tread width direction. This especially allows water in the ground contact surface to flow between protuberances adjacent in the tread circumferential direction, thereby achieving excellent drainage performance.

In addition, according to the present invention, a plurality of sipes are arranged in the land portion adjacent to the groove wall surface of the circumferential groove to which the plurality of protuberances extend, the plurality of sipes being open to the circumferential groove in areas where the respective plurality of protuberances are arranged. Since a partial increase in stiffness of the adjacent land portion caused by the formation of the protuberances is reduced by the formation of the sipes, the circumferential stiffness of the land portion can be made uniform to reduce road noise.

Here, both side surfaces of each of the plurality of protuberances extending in the tread width direction are each shaped like a circular arc whose center of curvature lies at a position outside the arrangement area of the protuberance, in a tread pattern developed view. This allows water to flow more smoothly between the protuberances, thus further improving drainage performance.

Here, the outer surface of each of the plurality of protuberances in the tire radial direction is shaped like a circular arc convex to the land portion of the groove wall surface to which the protuberance extends, in a sectional view along the direction orthogonal to the direction in which the circumferential groove provided with the protuberance extends. In this way, a decrease in groove volume of the circumferential groove caused by the formation of the protuberances is reduced to sufficiently ensure required drainage performance.

Here, the plurality of protuberances are arranged with a pitch equal to a pitch with which the plurality of sipes are arranged in the tread circumferential direction. Moreover, a tread circumferential distance between protuberances adjacent in the tread circumferential direction is less than or equal to half a tread circumferential length of each of the plurality of proturberances, at a tread widthwise center position of the protuberance extending in the tread width direction. By arranging the protuberances and the sipes in the tread circumferential direction with an appropriate pitch, water is allowed to flow smoothly between the protuberances to further improve drainage performance, and also the circumferential stiffness of the land portion is made more uniform to further reduce road noise.

Here, each of the plurality of sipes has one end open to the circumferential groove, and the other end terminating in the land portion in which the sipe is provided. This ensures sufficient stiffness of the land portion and thus lessens the deformation of the land portion, as compared with the case where the other end of the sipe is open to another circumferential groove. As a result, energy loss caused by the deformation of the land portion is decreased to reduce rolling resistance.

BRIEF DESCRIPTION OF THE DRAWINGS

The present invention will be further described below with reference to the accompanying drawings, wherein.

DETAILED DESCRIPTION

The following describes an exemplary embodiment of the present invention with reference to drawings.

Figure 1:
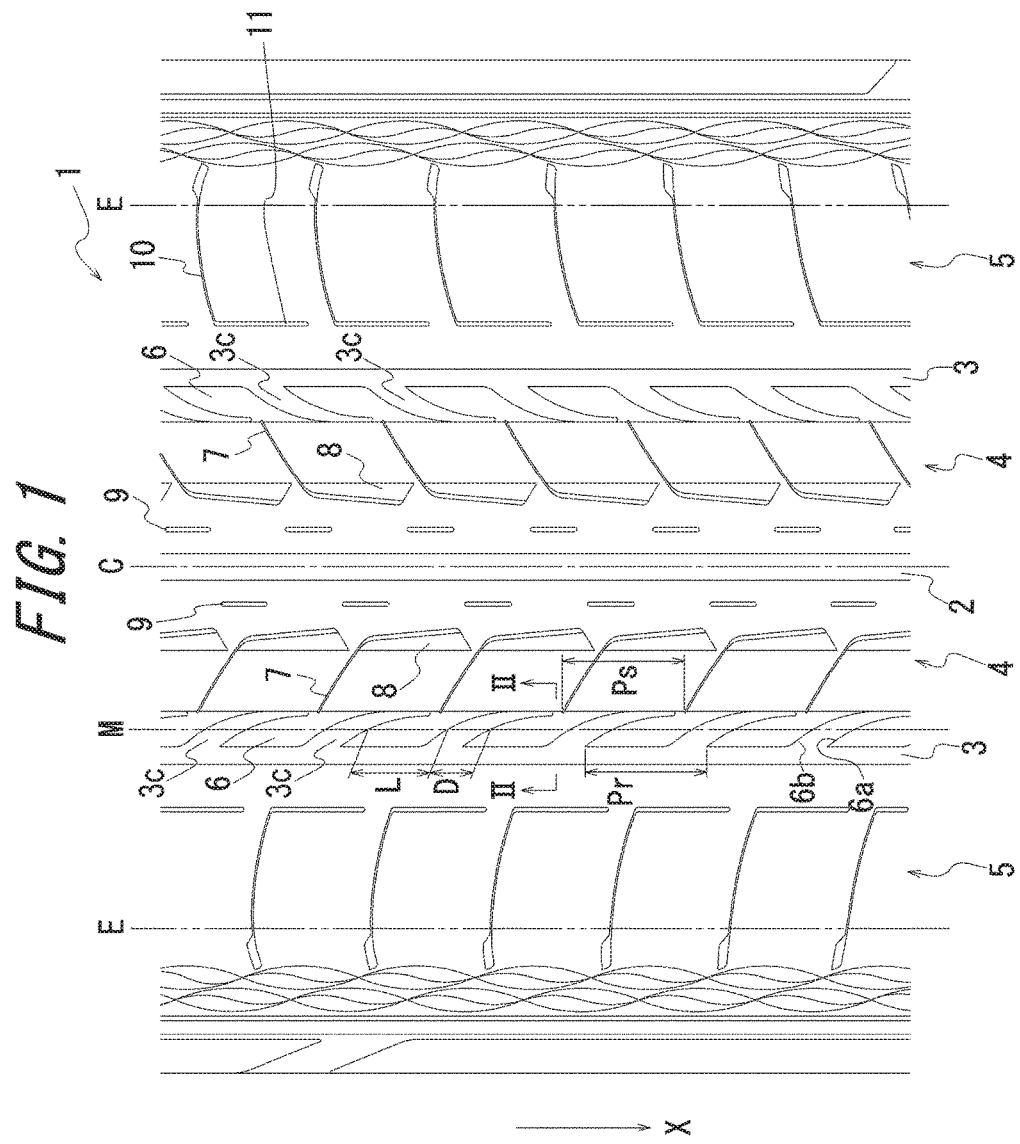
FIG. 1 is a partial developed view of a tread pattern representing an embodiment of the present invention.

In FIG. 1, reference sign 1 is a tread surface formed by tread rubber included in a pneumatic tire according to the present invention.

Though not illustrated, the pneumatic tire includes respective bead cores buried in a pair of bead portions and on or more carcass plies toroidally extending between the pair of bead portions, as with typical tires.

In FIG. 1, for example, three circumferential grooves 2, 3, and 3 each continuously extending linearly along the tread circumferential direction are formed in the tread surface 1. In this example, center-side land portions 4 and shoulder-side land portions 5 shaped like ribs and each continuous in the tread circumferential direction are defined by: the circumferential groove 2 extending on the tire equatorial plane C; the two circumferential grooves 3 extending on both sides of the circumferential groove 2, i.e. on the tread widthwise outer sides of the tire equatorial plane C, and wider than the circumferential groove 2 on the tire equatorial plane C; and tread surface ends E at the tread widthwise outermost positions of the tread surface 1.

In addition to or instead of the illustrated linearly extending circumferential grooves, circumferential grooves (not illustrated) having a zigzag, wavy, or other shape that continuously extend in the tread circumferential direction while being tilted relative to the tread circumferential direction and bent or curved at a plurality of locations may be formed in the tread surface 1. Moreover, though not illustrated, each land portion may be made into blocks by forming one or more widthwise grooves that extend while being tilted relative to the tread circumferential direction and are open to the circumferential grooves on both sides of the land portion.

Figure 2:
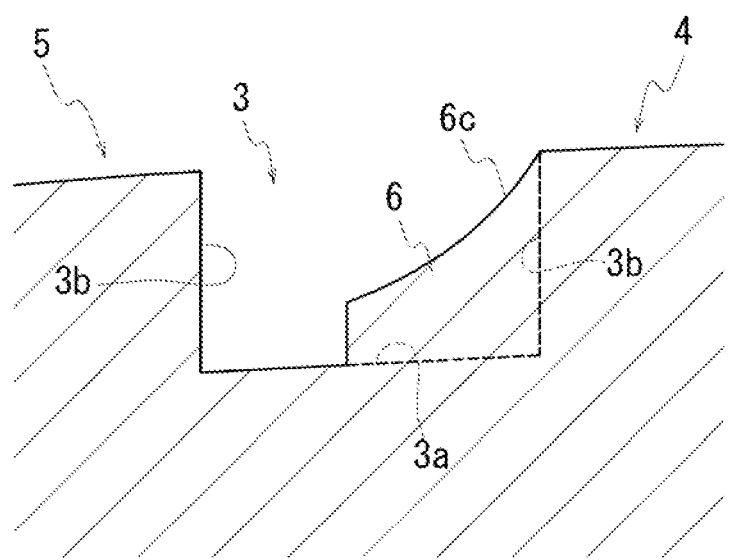
FIG. 2 is a sectional view along line II-II in FIG. 1.

In the present invention, for example, in each circumferential groove 3 other than the circumferential groove 2 on the tire equatorial plane C, a plurality of protuberances 6 raised from the inner surface of the circumferential groove 3 are arranged at intervals in the tread circumferential direction, and each of the protuberances 6 extending in the tread width direction while being tilted relative to the tread width direction extends from a groove bottom 3a of the circumferential groove 3 to at least one groove wall surface 3b, e.g. the groove wall surface 3b adjacent to the center-side land portion 4, as illustrated in a sectional view along the direction orthogonal to the extension direction of the circumferential groove 3 in FIG. 2. In FIG. 2, each protuberance 6 extends from the groove bottom 3a of the circumferential groove 3 to the groove wall surface 3b adjacent to the center-side land portion 4 so as to reach the open edge of the tread surface 1.

In the case where such protuberances 6 are arranged in the circumferential groove 3, water in the circumferential groove 3 flows through the intra-groove groove 3c between protuberances 6 adjacent in the tread circumferential direction in the tire ground contact surface. This facilitates drainage in the tread surface 1 and achieves excellent drainage performance, as compared with the case where the circumferential groove has uniform groove volume with no protuberances.

To further improve drainage performance, for example, both side surfaces 6a and 6b of each protuberance 6 extending in the tread width direction, i.e. the side surfaces 6a and 6b on both tread circumferential sides of the protuberance 6, are preferably in the shape of a circular arc that is convex to one side (upward in FIG. 1) in the tread circumferential direction and whose center of curvature is at a position outside the arrangement area of the protuberance 6, in the tread pattern developed view as illustrated in FIG. 1. Note, however, that at least one of the side surfaces 6a and 6b of the protuberance may be in any of various shapes including a linear shape and a shape of being bent or curved in at least one part.

The illustrated protuberance 6, which has the side surfaces 6a and 6b both in the shape of a circular arc convex to one side in the tread circumferential direction, is shaped so that its width along the tread circumferential direction gradually increases outward in the tread width direction, with the positions of the centers of curvature of the respective side surfaces 6a and 6b outside the arrangement area of the protuberance 6 being different from each other.

To secure required groove volume for drainage, an outer surface 6c of the protuberance 6 in the tire radial direction is preferably in the shape of a circular arc concave to the groove wall surface 3b to which the protuberance 6 extends, in the sectional view as illustrated in FIG. 2. Note, however, that the surface be of the protuberance 6 may be, for example, in the shape of being linearly tilted relative to the groove wall surface 3b or in the shape of a circular arc convex outward in the tire radial direction, in the same sectional view.

In the case where the protuberance 6 extends from the groove bottom 3a of the circumferential groove 3 to only one of the facing groove wall surfaces 3b as illustrated in FIGS. 1 and 2, water flows in the tread circumferential direction in the part on the groove wall surface 3b side where the protuberance 6 is not present. Moreover, a large groove volume can be secured as compared with the case where the protuberance extends to both groove wall surfaces 3b.

To effectively enhance drainage performance by the protuberances 6 while securing the groove volume of the circumferential groove 3, each protuberance 6 is preferably provided in the area of 5% to 40% of the groove cross-sectional area of the circumferential groove 3 in the sectional view in FIG. 2, and preferably provided in the area of 5% to 35% of the volume of the circumferential groove 3 in the developed view in FIG. 1.

In the illustrated pneumatic tire whose orientation of attachment to the vehicle body is designated so as to rotate in the direction indicated by the arrow in FIG. 1 when the vehicle moves forward, preferably each protuberance 6 is tilted backward of the rotation direction X in the tread widthwise outer part rather than in the tread widthwise inner part, and more preferably the angle of the protuberance 6 relative to the tread width direction gradually decreases outward in the tread width direction as illustrated in FIG. 1. This allows water to flow more smoothly between the protuberances 6, thus further enhancing drainage performance.

In the illustrated tire that exhibits different functions depending on the direction in which the tire rotates, a mark or the like (not illustrated) for designating the rotation direction X may be put on the surface of a sidewall portion, etc., to achieve desired functions by designating the rotation direction X.

In the case where the above-mentioned protuberances 6 are provided, drainage performance can be improved, but there is a possibility that road noise increases because the stiffness of the center-side land portion 4 adjacent to the groove wall surface 3b of the circumferential groove 3 to which each protuberance 6 extends differs significantly between the land portion area where the protuberance 6 is present and the land portion area where the protuberance 6 is not present and so the circumferential stiffness of the center-side land portion 4 is not uniform.

This can be resolved by arranging, in the tire radial outer surface of the center-side land portion 4 adjacent to the groove wall surface 3b of the circumferential groove 3 to which each protuberance 6 extends, a plurality of sipes 7 that are open to the circumferential groove 3 in the arrangement areas of the respective protuberances 6, as illustrated in FIG. 1.

Each sipe 7 provided in the center-side land portion 4 functions to decrease the stiffness increased due to the presence of the protuberance 6 extending to the groove wall surface 3b adjacent to the center-side land portion 4, so that the circumferential stiffness of the center-side land portion 4 can be made uniform to reduce road noise.

The reason why narrow sipes are arranged as grooves in the center-side land portion 4 to reduce road noise is that the movement of the blocks constituting the center-side land portion 4 during rolling under load is small and so the rolling resistance is low, as compared with the case where grooves wider than the sipes are arranged. A smaller volume of the sipes than the wider grooves also contributes to noise reduction.

Moreover, of the sipes 7 present in the tire ground contact surface, each sipe 7 having a part where facing groove wall surfaces are not in contact with each other functions to guide water in the center-side land portion 4 to the circumferential groove 3 to which the sipe 7 is open, to facilitate drainage in the center-side land portion 4. The sipes 7 thus contribute to improved drainage performance.

The arrangement pitch Pr of the plurality of protuberances 6 in the circumferential groove 3 in the tread circumferential direction is preferably equal to the arrangement pitch Ps of the plurality of sipes 7 in the adjacent center-side land portion 4 as illustrated in FIG. 1, for uniform circumferential stiffness of the center-side land portion 4.

In this case, at the tread widthwise center position M of the protuberances 6, the tread circumferential distance D between protuberances 6 adjacent in the tread circumferential direction is preferably less than or equal to half the tread circumferential length L of each protuberance 6, for the following reason. Since the protuberances 6 become blocks with grooves being formed between the protuberances 6 after the tread surface wears, if the tread circumferential distance D between the protuberances 6 is greater than L/2, the part may induce noise after wear.

The pitches, distances, lengths, etc. are measured in a state where the tire is attached to the applicable rim, filled to the specified internal pressure, and placed under no load.

The maximum groove depth of each sipe 7 provided in the center-side land portion 4 is preferably in a range from 50% to 110% of the maximum groove depth of the adjacent circumferential groove 3, as measured along the tire radial direction in the above-mentioned no-load state.

The sipe 7 preferably extends along the tread width direction. In the case where the sipe 7 extends while being tilted relative to the tread width direction as in the drawing, the tilt angle of the sipe 7 relative to the tread width direction is, for example, 2° to 30°. Although the illustrated sipe 7 extends linearly, the sipe 7 may extend while being bent or curved in at least one part, or extend in a zigzag manner or the like.

While one end of the sipe 7 is open to the circumferential groove 3 adjacent on the tread widthwise outer side as mentioned above, the other end of the sipe 7 preferably terminates in the center-side land portion 4 without being open to another circumferential groove 2 adjacent on the tread widthwise inner side. This ensures sufficient stiffness of the land portion and thus lessens the deformation of the land portion, as compared with the case where the other end of the sipe is open to another circumferential groove. As a result, energy loss caused by the deformation of the land portion is decreased to reduce rolling resistance.

The other end of the sipe 7 may be open to a corresponding one of a plurality of vertical grooves 8 arranged in the widthwise center area of the center-side land portion in the tread circumferential direction as illustrated, in the upper end part of the vertical groove 8 in the drawing. The vertical groove 8 has a groove bottom convex outward in the tire radial direction in its tread widthwise outer part, and so has a groove depth that gradually decreases outward in the tread width direction. Such sipes 7 and vertical grooves 8 can reduce air column resonance sound generated in the circumferential groove 3, and also improve drainage performance.

In the illustrated embodiment, a plurality of depressions extending along the tread circumferential direction are arranged at required intervals in the tread circumferential direction in the area of the center-side land portion 4 on the tread widthwise inner side of the vertical grooves 8, to make the circumferential stiffness of the center-side land portion 4 uniform.

In the tire illustrated in FIG. 1, each shoulder-side land portion 5 may be provided with: widthwise narrow grooves 10 arranged at intervals in the tread circumferential direction, the widthwise narrow grooves 10 each extending from the tread surface end E while being slightly curved so as to be convex backward of the rotation direction X and terminating before reaching the circumferential groove 3; and intermittent circumferential grooves 11 corresponding one-to-one to the widthwise narrow grooves 10, the intermittent circumferential grooves 11 each communicating with the tread widthwise inner end of the corresponding widthwise narrow groove 10 at the widthwise position, and extending intermittently in the tread circumferential direction. This enhances drainage performance.

Each widthwise narrow groove 10 also has a wider groove part on the tread widthwise outer side of the tread surface end E.

REFERENCE SIGNS LIST

1 tread surface
2, 3 circumferential groove
3a groove bottom of circumferential groove
3b groove wall surface of circumferential groove
4 center-side land portion
5 shoulder-side land portion
6 protuberance
6a, 6b side surface of protuberance
6c surface of protuberance
7 sipe
8 vertical groove
9 depression
10 widthwise narrow groove
11 intermittent circumferential groove
12 hole
C tire equatorial plane
E tread surface end
M widthwise center position of protuberance
Pr arrangement pitch of protuberances
Ps arrangement pitch of sipes
D tread circumferential distance between protuberances
L tread circumferential length of protuberance

The invention claimed is:

1. A pneumatic tire in which at least one circumferential groove continuously extending in a tread circumferential direction is formed in a tread surface to define land portions by the circumferential groove,
wherein a plurality of protuberances are arranged in the circumferential groove at intervals in the tread circumferential direction to define an intra-groove groove between protuberances adjacent in the tread circumferential direction, the plurality of protuberances being raised from an inner surface of the circumferential groove and extending from a groove bottom of the circumferential groove to at least one groove wall surface in a tread width direction,
a plurality of sipes are arranged in a land portion adjacent to the groove wall surface of the circumferential groove to which the plurality of protuberances extend, the plurality of sipes being open to the circumferential groove in areas where the respective plurality of protuberances are arranged,
a plurality of vertical groves are arranged, in the tread circumferential direction, in the land portion adjacent to the groove wall surface of the circumferential groove to which the plurality of protuberances extend, and
the other end of each of the plurality of sipes opens to a corresponding one of the plurality of vertical grooves.

2. The pneumatic tire according to claim 1, wherein both side surfaces of each of the plurality of protuberances extending in the tread width direction are each shaped like a circular arc in a tread pattern developed view, the side surfaces being on both sides of the protuberance in the tread circumferential direction.

3. The pneumatic tire according to claim 1, wherein an outer surface of each of the plurality of protuberances in a tire radial direction is shaped like a circular arc concave to the groove wall surface to which the protuberance extends, in a sectional view along a direction orthogonal to the direction in which the circumferential groove provided with the protuberance extends.

4. The pneumatic tire according to claim 1, wherein the plurality of protuberances are arranged with a pitch equal to a pitch with which the plurality of sipes are arranged in the tread circumferential direction, and
a tread circumferential distance between protuberances adjacent in the tread circumferential direction is less than or equal to half a tread circumferential length of each of the plurality of protuberances, at a tread widthwise center position of the protuberance extending in the tread width direction.

5. The pneumatic tire according to claim 2, wherein an outer surface of each of the plurality of protuberances in a tire radial direction is shaped like a circular arc concave to the groove wall surface to which the protuberance extends, in a sectional view along a direction orthogonal to the direction in which the circumferential groove provided with the protuberance extends.

6. The pneumatic tire according to claim 2, wherein the plurality of protuberances are arranged with a pitch equal to a pitch with which the plurality of sipes are arranged in the tread circumferential direction, and
a tread circumferential distance between protuberances adjacent in the tread circumferential direction is less than or equal to half a tread circumferential length of each of the plurality of protuberances, at a tread widthwise center position of the protuberance extending in the tread width direction.

7. The pneumatic tire according to claim 3, wherein the plurality of protuberances are arranged with a pitch equal to a pitch with which the plurality of sipes are arranged in the tread circumferential direction, and
a tread circumferential distance between protuberances adjacent in the tread circumferential direction is less than or equal to half a tread circumferential length of each of the plurality of protuberances, at a tread widthwise center position of the protuberance extending in the tread width direction.

8. The pneumatic tire according to claim 5, wherein the plurality of protuberances are arranged with a pitch equal to a pitch with which the plurality of sipes are arranged in the tread circumferential direction, and a tread circumferential distance between protuberances adjacent in the tread circumferential direction is less than or equal to half a tread circumferential length of each of the plurality of protuberances, at a tread widthwise center position of the protuberance extending in the tread width direction.

9. The pneumatic tire according to claim 2, wherein each of the plurality of sipes has one end open to the circumferential groove, and the other end terminating in the land portion in which the sipe is provided.

10. The pneumatic tire according to claim 1, wherein the vertical groove has a groove depth that gradually decreases outward in the tread width direction.

11. The pneumatic tire according to claim 1, wherein the sipe extends while being tilted relative to the tread width direction.

\* \* \* \* \*